(12) United States Patent
Heinis et al.

(10) Patent No.: US 8,017,664 B2
(45) Date of Patent: Sep. 13, 2011

(54) PROCESS FOR PREPARING POLYMER POLYOLS

(75) Inventors: Bob Heinis, Amsterdam (NL); Willem Karzijn, Amsterdam (NL); Martien Krijger, Amsterdam (NL); Martinus Johannes Maria Lelieveld, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1182 days.

(21) Appl. No.: 10/437,665

(22) Filed: May 14, 2003

(65) Prior Publication Data

US 2003/0220410 A1 Nov. 27, 2003

(30) Foreign Application Priority Data

May 22, 2002 (EP) .................................. 02253584

(51) Int. Cl.
*C08G 18/28* (2006.01)

(52) U.S. Cl. ........ 521/137; 521/138; 521/139; 521/170; 521/174; 524/762; 524/765; 524/769

(58) Field of Classification Search .................. 521/137, 521/138, 139, 170, 174; 524/762, 765, 769
See application file for complete search history.

(56) References Cited

U.S. PATENT DOCUMENTS

| | | | |
|---|---|---|---|
| 5,196,476 A | 3/1993 | Simroth | ........................ 524/769 |
| 5,223,570 A | 6/1993 | Huang et al. | ..................... 525/53 |
| 5,359,019 A | 10/1994 | Hayes et al. | ................... 526/262 |
| 6,624,209 B2 * | 9/2003 | Kawamoto et al. | ........... 521/137 |

FOREIGN PATENT DOCUMENTS

| | | |
|---|---|---|
| EP | 698628 B1 | 2/1996 |
| EP | 768324 B1 | 4/1997 |
| GB | 777411 | 6/1957 |
| GB | 1450244 | 9/1976 |
| WO | 99/40144 | 8/1999 |

OTHER PUBLICATIONS

International Search Report, dated Aug. 12, 2003.
Mihail Ionescu, Chemistry and Technology of Polyols for Polyurethanes, Rapra Technology Limited, 2005, Chapter 6: Polymer Polyols (Filled Polyols), pp. 185-186.

* cited by examiner

*Primary Examiner* — John Cooney

(57) ABSTRACT

The invention relates to a process for the batch or semi-batch preparation of a polymer polyol, which process involves (1) preparing a seed by polymerizing in a base polyol at least one ethylenically unsaturated monomer in the presence of a polymerization initiator and macromer, and in the presence of from 0.5 to 50% wt of polymer polyol heel, based on amount of polymer present in the heel compared with total amount of polymer formed, (2) adding additional ethylenically unsaturated monomer to the seed obtained in step (1) and optionally additional polyol, and (3) polymerizing the mixture obtained in step (2).

14 Claims, No Drawings

PROCESS FOR PREPARING POLYMER POLYOLS

FIELD OF THE INVENTION

The present invention relates to a process for the preparation of polymer polyols.

BACKGROUND OF THE INVENTION

Polymer polyols are commonly used for the manufacture of flexible polyurethane foams. Flexible polyurethane foams are widely used in numerous applications. The main sectors of application for such foams are the automotive and aircraft industries, upholstered furniture and technical articles. For instance, full foam seats, top pads for the seats and restraints for back and head, all made from flexible polyurethane foam, are widely used in cars and airplanes. Other applications include the use of flexible polyurethane foam as carpet backings, bedding and mattresses, foamed seat saddles for motorbikes, gaskets between a car body and its lights, lip seals of air filters for engines and insulating layer on car parts and engine parts to reduce sound and vibration. It will be appreciated that each specific application puts its own demands on the flexible foam to be used. Important characteristics in this connection are density, hardness, resilience and dampening behavior of the foam and in order to fit each application, these characteristics should be optimally balanced and adjusted.

A problem generally encountered in the manufacture of polymer polyols, i.e. a system wherein a polymer is stably dispersed in a base polyol, is to obtain a polymer polyol having both a relatively high solid polymer content and a sufficiently low viscosity for ease of handling. A polymer polyol having this combination of properties generally is favorable for the properties of polyurethane foam produced from such polymer polyol.

EP-A-698628 discloses a semi-batch process for preparing polymer polyol by polymerization of styrene and acrylonitrile in a polyether polyol in a batch reactor in the presence of preformed polymer polyol, wherein of from 0.25 to 3% wt of the polymer solids in the final polymer polyol comes from the preformed polymer polyol.

EP-A-768324 discloses a continuous process for the preparation of highly stable, finely divided, low viscosity polymer polyols wherein in the first step an intermediate is prepared by reacting (1) a mixture of styrene and acrylonitrile in a mixture of (2) a polyoxyalkylene polyether polyol and (3) a macromer in the presence of (4) a free radical initiator, (5) a solvent having moderate chain transfer activity and optionally (6) a reaction moderator.

U.S. Pat. No. 5,223,570 teaches that a combination of continuous and semi-batch operation is necessary in order to obtain graft polymer dispersions having broad particle size distribution without wildly fluctuating viscosities. Such combination is unattractive as it requires both equipment for continuous operation and equipment for semi-batch operation.

SUMMARY OF THE INVENTION

The present invention provides a process for preparing polymer polyols which were found to have a low viscosity at relatively high solids content while having a broad particle size distribution. A broad particle size distribution has been observed to give improved cell opening. Improved cell opening generally leads to a decreased lower force to crush, which is the force needed to crush the foam for the first time.

Thus, the present invention relates to a process for the batch or semi-batch preparation of a polymer polyol, which process comprises (1) preparing a seed by polymerizing in a base polyol at least one ethylenically unsaturated monomer in the presence of a polymerization initiator and macromer, and in the presence of from 0.5 to 50% wt of polymer polyol heel, based on amount of polymer present in the heel compared with total amount of polymer formed, (2) adding additional ethylenically unsaturated monomer to the seed obtained in step (1) and optionally additional polyol, and (3) polymerizing the mixture obtained in step (2).

Although the use of a heel in a semi-batch process has been described in EP-A-698628 and the use of a seed for a continuous process has been described in EP-A-768324, it was not known that further improved polymer polyol can be obtained by the use of both a seed and a heel in a batch or semi-batch process.

DETAILED DESCRIPTION OF THE INVENTION

The base polyol used in the process according to the present invention preferably is a polyether polyol, also frequently referred to as polyoxyalkylene polyols. Such polyether polyols are typically obtained by reacting a starting compound having a plurality of active hydrogen atoms with one or more alkylene oxides, such as ethylene oxide, propylene oxide, butylene oxide or mixtures of two or more of these. Suitable polyether polyols are those having a nominal molecular weight in the range of from 1500 to 15,000 and an average nominal functionality (Fn) of at least 2.0. Preferably, the polyol also has a high primary hydroxyl content, suitably of at least 70%. It has been found particularly advantageous to use polyols having a molecular weight in the range of from 2500 to 14,000. Such polyols preferably further have a Fn in the range of from 2.5 to 6.0. Preferably, these polyols have a primary hydroxyl content in the range of from 70 to 100%, more preferably from 75 to 95%. The hydroxyl-value of the polyol suitably has a value of from 20 to 150 mg KOH/g, more suitably of from 25 to 75 mg KOH/g. Examples of suitable polyols include CARADOL SC46-02, CARADOL SC36-13, CARADOL MC36-03, CARADOL SC56-02, CARADOL SC 36-11 and CARADOL MH56-03 (CARADOL is a trademark). Most preferably, CARADOL SC36-13 polyol and CARADOL SC 36-11 are used.

Suitable ethylenically unsaturated monomers for preparing the dispersed polymer include vinyl aromatic hydrocarbons, like styrene, alpha-methyl styrene, methyl styrene and various other alkyl-substituted styrenes. Of these, the use of styrene is preferred. The vinyl aromatic monomer may be used alone or in combination with other ethylenically unsaturated monomers, such as acrylonitrile, methacrylonitrile, vinylidene chloride, various acrylates and conjugated dienes like 1,3-butadiene and isoprene. Preferred ethylenically unsaturated monomers to be used for the purpose of the present invention are styrene and acrylonitrile in a molar ratio of from 30:70 to 100:0. It is, however, particularly preferred to use styrene alone or a combination of styrene and acrylonitrile in a molar ratio styrene:acrylonitrile of from 33:67 to 67:33, resulting in the dispersed polymers polystyrene and styrene-acrylonitrile (SAN) copolymers, respectively.

Polymer polyol heel present in step (1) is preformed polymer polyol. Such preformed polymer polyol can be added to the reactor or formed in situ before adding further compounds. However, it is preferred that the polymer polyol heel is polymer polyol which remained in the reactor. An easy way of ensuring that heel is present in the reactor is to stop the removal of polymer polyol product before the reactor has been fully emptied.

In step (1), macromer is present. Macromer is considered to be a polyol containing induced unsaturation. Macromers which can be used include, but are not limited to the reaction product of a polyol with a reactive unsaturated compound such as maleic anhydride, fumaric acid, 1,1-dimethyl-m-isopropenyl-benzyl-isocyanate, isocyanato-thylmethacrylate, 2-butene-1,4-diol, 1-butene-3,4-diol, hydroxyethylmethacrylate, hydroxypropyl acrylate, methyl methacrylate, acrylic and methacrylic acid, methacroyl chloride, glycidyl methacrylate and allyl glycidyl ether. If a polycarboxylic acid or anhydride is employed, it is preferred to react the unsaturated polyol with an alkylene oxide. The polyol for preparing the macromer preferably has a hydroxyl functionality of at least 3.

A preferred macromer has been described in WO-A-99/40144, herein incorporated by reference. Such macromer is suitable as a stabilizer precursor in a polymer polyol, and has been prepared by a process which comprises reacting a polyol with a cyclic dicarboxylic acid anhydride not containing any polymerizable double bond, and subsequently reacting the adduct thus obtained with an epoxide compound containing a polymerizable double bond. The polyol preferably is sorbitol reacted with a mixture of propylene oxide and ethylene oxide. The cyclic dicarboxylic acid anhydride preferably is phthalic anhydride. The epoxide compound preferably is glycidyl methacrylate or glycidyl acrylate. The adduct can first partly be reacted with a di- or higher functional epoxide compound before being reacted with the epoxide compound containing a polymerisable double bond. Further, the polyol can be reacted with a di-or higher functional isocyanate compound preceding the reaction between the polyol and the cyclic dicarboxylic acid anhydride. A method for preparing the macromer comprises reacting the adduct first partly with the epoxide compound containing a polymerisable double bond and subsequently reacting the reaction product thus obtained with a di- or higher functional epoxide compound or a di- or higher functional isocyanate compound.

The macromer preferably has a nominal molecular weight of at least 4000, preferably in the range of from 5000 to 50,000, and a functionality of at least 3.

The amount of ethylenically unsaturated monomers present during the process steps of the present invention can vary widely. In each step of the process according to the present invention, the amount of ethylenically unsaturated monomer will generally differ between of from 10 to 60% by weight based on total weight of base polyol, polymer, monomer(s) and macromer. However, the amount of monomer(s) in step (1) can be higher or lower dependent on whether (part of) the polyol is added together with the monomer(s). It is possible to have all base polyol already present in step (1), while it is also possible to add the majority of the base polyol in step (2) and/or (3). Preferably, the amount of ethylenically unsaturated monomer(s) in step (1) and/or (2) is 20 to 55% by weight, more preferably 30 to 50% by weight, based on total weight of base polyol, polymer, monomer(s) and macromer.

The base polyol optionally added in step (2) can be the same or can be different from the base polyol as present in step (1). Preferably, the base polyols of step (1) and (2) are the same.

The gist of the present invention resides in the presence of polymer polyol heel when reacting a minor amount of ethylenically unsaturated monomer and macromer, and subsequently adding and reacting the major amount of ethylenically unsaturated monomer. Generally, a minor amount of the final product remains behind when removing polymer polyol from the reactor operated in batch or semi-batch operation. However, this amount will generally be well below 0.5% wt.

The amount of polymer derived from the heel present in step (1), based on total amount of polymer present after the reaction of step (1) has taken place, is of from 0.5 to 50% wt, preferably of from 3 to 30% wt, more specifically of from 4 to 20% wt.

Preferably, the amount of polymer derived from step (1) as present in the final product, is of from 3 to 30% wt, more specifically of from 4 to 20% wt. The amount of polymer derived from step (1) is the amount of polymer derived from the heel and the amount of polymer formed in step (1) when reacting the polymer derived from the heel, the macromer, the ethylenically unsaturated monomer and the initiator. In view of the substantially complete reaction of styrene, acrylonitrile and the preferred macromer, it is to be assumed that styrene, acrylonitrile and such macromer are the polymer which is present in the seed. Additionally, the seed polymer will contain polymer derived from the polymer polyol heel.

Polymerization of the monomers is effected by the presence of a polymerization initiator. Such initiator is usually applied in an amount of from 0.01 to 5% by weight based on total weight of monomers. Suitable polymerization initiators are known in the art and include both peroxide compounds and azo compounds. Examples of peroxides are dibenzoyl peroxide, lauroyl peroxide, t-butyl hydroperoxide, benzoyl peroxide and di-t-butyl peroxide. Examples of suitable azo compounds are azobis(isobutyronitrile) (AIBN) and azobis (2-methylbutanenitrile) (AMBN).

Chain transfer agents may also be added to or be present in the polymerization reaction medium in small amounts. The use of chain transfer agents and their nature is known in the art. Chain transfer agents enable a control of the cross-linking occurring between the various polymer molecules and hence may affect stability of the polymer polyol. If used at all, a chain transfer agent is suitably used in an amount of from 0.1 to 6% by weight, preferably 0.2 to 5% by weight, based on total weight of reactants. Examples of suitable chain transfer agents are 1-butanol, 2-butanol, isopropanol, ethanol, methanol, cyclohexane and mercaptans, such as dodecanethiol, ethanethiol, 1-heptanethiol, 2-octanethiol and toluenethiol.

Other compounds, such as compounds facilitating mixing of the various components, compounds which have a viscosity-lowering effect and/or compounds which enable one or more of the components used to better dissolve in the reaction medium may also be applied. An example of a compound having a viscosity-lowering effect, thus enabling a better mixing of the components, is toluene.

The various components used in the process to prepare polymer polyols in accordance with the present invention may be mixed together in different ways. This can be achieved batchwise or in a semi-batch operation. In the latter case one or more compounds are added to the reactor continuously for a limited amount of time. Batch operation and semi-batch operation differ from continuous operation in that in batch and semi-batch operation the product is removed from the reactor discontinuously. In principle, any known manner is suitable for the purpose of the present invention. One way, for instance, is to prepare the polymer polyol by dosing the monomers, the polymerization initiator and part (10-90%) of the base polyol to a reactor containing the remainder of the base polyol (90-10%), the macromer and a chain transfer agent. Other auxiliaries like toluene may be used as well and can be present in the feed and/or in the reactor.

The polymer polyol according to the present invention is very suitable for the preparation of flexible polyurethane foams by reacting it with a suitable polyisocyanate in the presence of a suitable polyurethane catalyst, a suitable blowing agent and optionally a cross-linking agent. This reaction is also commonly denoted as foaming. Thus, the present invention also relates to a flexible polyurethane foam obtainable by foaming a composition comprising a polymer polyol as specified herein before and a polyisocyanate component.

Polyurethane catalysts are known in the art and include many different compounds. An extensive list of polyurethane catalysts is, for instance, given in U.S. Pat. No. 5,011,908, herein incorporated by reference. For the purpose of the present suitable catalysts include tin-based catalysts, such as tin salts and dialkyl tin salts of carboxylic acids. Specific examples are stannous octoate, stannous oleate, dibutyltin dilaureate, dibutyltin acetate and dibutyltin diacetate. Other suitable catalysts are tertiary amines, such as, for instance, bis(2,2'-dimethylamino)ethyl ether, trimethylamine, triethylamine, triethylenediamine and dimethylethanolamine. Examples of commercially available tertiary amine catalysts are those sold under the tradenames NIAX, TEGOAMIN and DABCO (all trademarks). The catalyst is typically used in an amount of from 0.01 to 2.0 parts by weight per hundred parts by weight of polymer polyol (php). Preferred amounts of catalyst are from 0.05 to 1.0 php.

The use of cross-linking agents in the production of polyurethane foams is well known. Polyfunctional glycol amines are known to be useful for this purpose. The polyfunctional glycol amine which is most frequently used and is also useful in the preparation of the present flexible polyurethane foams, is diethanol amine, often abbreviated as DEOA. If used at all, the cross-linking agent is applied in amounts up to 3.0 php, but amounts in the range of from 0.2 to 1.5 php are most suitably applied.

Suitable blowing agents include water, acetone, (liquid) carbon dioxide, halogenated hydrocarbons, aliphatic alkanes and alicyclic alkanes. Due to the ozone depleting effect of the fully chlorinated, fluorinated alkanes (CFC's) the use of this type of blowing agents is generally not preferred, although it is possible to use them within the scope of the present invention. The halogenated alkanes, wherein at least one hydrogen atom has not been substituted by a halogen atom (the so-called HCFC's) have no or hardly any ozone depleting effect and therefore are the preferred halogenated hydrocarbons to be used in physically blown foams. A very suitable HCFC type blowing agent is 1-chloro-1,1-difluoroethane. The use of water as a (chemical) blowing agent is also well known. Water reacts with isocyanate groups according to the well known $NCO/H_2O$ reaction, thereby releasing carbon dioxide which causes the blowing to occur. The aliphatic and alicyclic alkanes, finally, were developed as alternative blowing agents for the CFC's. Examples of such alkanes are n-pentane and n-hexane (aliphatic) and cyclopentane and cyclohexane (alicyclic). It will be understood that the above blowing agents may be used singly or in mixtures of two or more. The amounts wherein the blowing agents are to be used are those conventionally applied, i.e. between 0.1 to 5 php in case of water and between about 0.1 and 20 php in case of halogenated hydrocarbons, aliphatic alkanes and alicyclic alkanes.

In addition, other well known auxiliaries, such as flame retardants, foam stabilisers (surfactants) and fillers may also be used. Organosilicone surfactants are most conventionally applied as foam stabilisers in polyurethane production. A large variety of such organosilicone surfactants is commercially available. Usually, such foam stabiliser is used in an amount of up to 5% by weight based on the reaction mixture of polymer polyol reactant and polyisocyanate reactant.

In a final aspect the present invention relates to shaped articles comprising the flexible polyurethane foam described herein before.

EXAMPLE 1

Into a one liter reactor provided with stirrer, heater, thermocouple, condenser, inlet and outlet means, and under a blanket of nitrogen was charged under a nitrogen blanket 692 g of a polyoxyalkylene hexa-ol containing 21% wt of ethylene oxide incorporated at random. The polyoxyalkylene hexa-ol had an OH-value of 30 mg KOH/g and a nominal molecular weight of 11,000. After heating to 80° C., 7.2 grams of phthalic anhydride (=13 molar percent on OH group) was charged and dissolved. Subsequently, 0.66 grams of dibutyltindilaurate (DBTDL) was added and 18 grams of acetone, and the temperature was raised to 120° C. After 4 hours, it was established (by acid number) that the reaction was complete, and acetone was removed by evaporation. Subsequently, 7.86 grams of glycidyl methacrylate (=114 molar percent on anhydride group) and 0.51 grams of tetrabutylammoniumiodide (TBAI) in 20 grams of isopropanol were added and the mixture was reacted for 16 hours at 120° C.

The product obtained (macromer A) was a clear yellow liquid having a viscosity of 1560 mpa.s.

EXAMPLE 2

Macromer B was made as described in Example 1, with the difference that the hexa-ol based polyol contained 18% wt of ethylene oxide incorporated at random, and having an OH value of 30 mg KOH/g. Macromer B had a viscosity of 1230 mPa.s.

EXAMPLE 3 AND COMPARATIVE EXAMPLES 1 AND 2

The macromers were used to prepare polymer polyols in the experiments designated Example 3 (macromer B), Comparative Example 1 (macromer A) and Comparative Example 2 (macromer B).

A reactor was used fitted with a heater, a stirrer a thermocouple and inlet and outlet means and under a blanket of nitrogen. The charged heel was part of the product of a previous reaction.

In order to prepare the seed, the amounts of reactants as indicated in Table I were added to the reactor. The base polyol was CARADOL 36-13 polyol. Subsequently, the reactor and its contents were heated to a temperature of 60 to 90° C. At this point in time, the feed for the seed is added and allowed to react at 90° C. for between 30 and 45 minutes.

After the seed had been formed, the temperature was increased to 100° C. and the further reactants were added in the course of 2 to 3 hours. 30 minutes after addition of reactants was finished, the crude polymer polyol was subjected to stripping under reduced pressure (10 mbar) at 120° C.

The results are indicated in Table II.

The expression "particle size span" refers to the width of the peak indicating the monomodal polymer particle size distribution. The particle size span (PS span) is defined as PS span=d(90%)−d(10%)/d(50%)

wherein d(x %) is the particle diameter in micron at which x % by volume of the particles has a smaller particle diameter. The particle size measurements were on a volume basis and were carried out by laser light scattering technique with the help of a Malvern Mastersizer.

The "force to crush" provides an indication of the level of difficulty that is encountered in bursting the cell walls for the first time, so-called "crushing" of a molded foam. The force to crush is the force required to indent for the first time the center portion of a bag of foam to 25% of its original height with a circular indentor foot. The force to crush was measured on a foam which was prepared from polymer polyol diluted with polyol to a solids content of 17% wt. The amount of polymer polyol is taken as 100 parts by weight. The foam formulation further comprised 3 parts by weight of water, 0.12 parts by weight of amine catalyst, 1 parts by weight of diethanolamine, 0.4 parts by weight of silicone surfactant and 0.15 parts by weight of dibutyltindilaurate. This formulation was reacted with toluene diisocyanate at an index of 105.

The abbreviation AMBN stands for azobis(2-methylbutanenitrile), which is an initiator.

The viscosity is measured according to ASTM D 4878.

The mean particle size is determined on basis of volume.

From Table II it can be seen that the process according to the present invention gives stable polymer polyols which have low viscosities (i.e. <10,000 mPa.s at 25° C.) at high solids content (between 37 and 45% by weight based on total amount of polymer polyol). Furthermore, the mean particle size is well below 2 μm, which is an indication that the particles can remain in a stably dispersed condition. Furthermore, the span of the particle size distribution is more than 2.0 and additionally the force to crush is well below 1000 N.

TABLE 1

|  |  | seed and heel Example 3 | seed Comparative Example 1 | heel Comparative Example 2 |
|---|---|---|---|---|
| Heel |  |  |  |  |
| polyol | g | 405.1 | 199.5 | 260.6 |
| macromer A |  | 0 | 25 | 0 |
| macromer B |  | 50.6 | 0 | 30.8 |
| isopropanol | g | 80.0 | 40 | 48 |
| heel | g | 33.8 | 0 | 20.7 |
| reactor content | g | 569.5 | 264.5 | 360.1 |
| polymer of heel | g | 13.52 | 0 | 8.28 |
| in charge | % w | 2.4 | 0 | 2.3 |
| Seed |  |  |  |  |
| polyol | g | 66.34 | 33.27 | 0 |
| styrene monomer | g | 43.92 | 21.71 | 0 |
| acrylonitrile monomer | g | 29.04 | 14.03 | 0 |
| AMBN | g | 1.00 | 0.49 | 0 |
| total seed feed reactor content | g | 140.3 | 69.5 | 0 |
| polyol | g | 491.7 | 232.8 | 273.0 |
| macromer A | g | 0 | 25 | 0 |
| macromer B | g | 50.6 | 0 | 30.8 |
| isopropanol | g | 80.0 | 40.0 | 48.0 |
| AMBN | g | 1.00 | 0.49 | 0.00 |
| polymer | g | 86.5 | 35.7 | 8.3 |
| total reactor content | g | 709.8 | 334.0 | 360.1 |
| Additional monomer and polyol |  |  |  |  |
| polyol | G | 673.7 | 340.9 | 381.9 |
| styrene monomer | G | 446.1 | 222.5 | 281.3 |
| acrylonitrile monomer | G | 295.0 | 143.8 | 183.9 |
| AMBN | G | 10.2 | 5.0 | 6.3 |
| total reactor content | G | 2134.7 | 1046.2 | 1213.5 |

TABLE 1-continued

|  |  | seed and heel Example 3 | seed Comparative Example 1 | heel Comparative Example 2 |
|---|---|---|---|---|
| Product |  |  |  |  |
| theoretical amount of solids (100% conversion) | G % w | 827.5 40.5 | 402.0 40.2 | 473.5 40.8 |
| actual amount of styrene-acrylonitrile solids | g % w | 814.0 40.1 | 392.3 39.6 | 466.4 40.5 |
| reactor content after stripping | G | 2030.0 | 990.9 | 1152.1 |

TABLE 2

| Polymer polyol |  | Example 3 | Comparative Example 1 | Comparative Example 2 |
|---|---|---|---|---|
| viscosity, 25° C. | mPa.s | 6100 | 7240 | 6200 |
| mean particle size | μm | 0.35 | 0.34 | 0.35 |
| span of particle size distribution |  | 2.34 | 1.32 | 1.77 |
| maximum particle size | μm | 3.09 | 1.06 | 1.44 |
| force to crush | N | 722 | 1365 | 1012 |

What is claimed:

1. A process for the batch or semi-batch preparation of a polymer polyol, which process comprises:
   (1) preparing a seed by polymerizing in a base polyol at least one ethylenically unsaturated monomer in the presence of a polymerization initiator and macromer, and in the presence of from 0.5 to 50% wt of polymer polyol heel, based on amount of polymer present in the heel compared with total amount of polymer formed;
   (2) adding additional ethylenically unsaturated monomer to the seed obtained in step (1) and optionally additional polyol; and,
   (3) polymerizing the mixture obtained in step (2) wherein the polymer polyol is formed in a batch or semi-batch process.

2. The process of claim 1, in which the amount of polymer derived from step (1) as present in the final product, is of from 3% wt to 30% wt.

3. The process of claim 1, in which the polyol has a nominal molecular weight in the range of from 1500 to 15,000 and an average nominal functionality of at least 2.0.

4. The process of claim 3, in which the polyol has a primary hydroxyl content of at least 70%.

5. The process of claim 1, in which the polyol has a nominal molecular weight in the range of from 2500 to 14,000 and an average nominal functionality in the range of from 2.5 to 6.0.

6. The process of claim 1, in which the polyol has a primary hydroxyl content in the range of from 75 to 95%.

7. The process of claim 1, in which the ethylenically unsaturated monomers are styrene and acrylonitrile in a molar ratio of from 30:70 to 100:0.

8. The process of claim 7, in which the molar ratio is in the range of from 33:67 to 67:33.

9. The process of claim 1 in which process the macromer is obtained by reacting a polyol with a cyclic dicarboxylic acid anhydride not containing any polymerizable double bond, to obtain an adduct and subsequently reacting the adduct thus obtained with an epoxide compound containing a polymerizable double bond.

10. The process of claim 9, in which the macromer has a nominal molecular weight in the range of from 5000 to 50,000.

11. The process of claim 9 in which the polyol for preparing the macromer has a hydroxyl functionality of at least 3.

12. The process of claim 9, in which the cyclic dicarboxylic acid anhydride is phthalic anhydride.

13. The process of claim 11, in which the epoxide compound is glycidyl methacrylate or glycidyl acrylate.

14. The process of claim 13, in which the polymerization initiator is present in an amount of from 0.01 wt % to 5 wt % based on total weight of monomer.

* * * * *